(12) United States Patent
Teijido et al.

(10) Patent No.: US 7,213,389 B2
(45) Date of Patent: May 8, 2007

(54) INFINITELY VARIABLE TRANSMISSION FOR A COMBINE HEADER UNIT

(75) Inventors: Joseph Albert Teijido, East Moline, IL (US); Jeffrey Lee Wigand, Moline, IL (US); Daniel Ray Anderson, Bettendorf, IA (US); Robert Wayne Hawkins, Rapid City, IL (US); Werner Stettler, Jr., Cedar Falls, IA (US); Helmut Weis, Massweiler (DE); Bernd Kempf, Althornbach (DE); Johann Hwang Pierce, Dewitt, IA (US)

(73) Assignee: Deere & Company, Moline, IL (US)

( * ) Notice: Subject to any disclaimer, the term of this patent is extended or adjusted under 35 U.S.C. 154(b) by 494 days.

(21) Appl. No.: 10/791,328

(22) Filed: Mar. 2, 2004

(65) Prior Publication Data

US 2005/0193698 A1 Sep. 8, 2005

(51) Int. Cl.
*A01D 69/00* (2006.01)
(52) U.S. Cl. ....................................................... 56/10.8
(58) Field of Classification Search ................. 56/10.8, 56/11.1, 11.2, 11.3, 11.4, 11.5, 11.7, 11.8
See application file for complete search history.

(56) References Cited

U.S. PATENT DOCUMENTS 4,019,404 A 4/1977 Schauer ........................ 74/687
4,663,713 A 5/1987 Cornell et al. ........... 364/424.1
5,667,452 A 9/1997 Coutant ........................ 475/81
5,865,700 A 2/1999 Horsch ........................ 475/72
6,247,295 B1 6/2001 Hansen et al. ............... 56/10.2
6,247,296 B1 6/2001 Becker et al.
6,587,771 B2 7/2003 Panoushek et al. ........... 701/50
6,663,525 B1 * 12/2003 McKee et al. ................. 475/72
2003/0109292 A1 6/2003 Schroeder
2004/0060273 A1 * 4/2004 Weber et al. ............. 56/10.2 R
2005/0014603 A1 * 1/2005 Brome et al. .................. 477/38

* cited by examiner

Primary Examiner—Árpád Fábián Kovács

(57) ABSTRACT

A mechanism for powering a combine header unit at infinitely variable speeds. A primary motor is coupled to a primary input shaft via a clutch, a variable-speed secondary motor is directly coupled to a secondary input shaft, and the header unit coupled to a header output shaft. A planetary gear-train couples the primary input shaft, the secondary input shaft, and the header output shaft to each other. A primary brake is coupled to the primary input shaft, and a secondary brake coupled to the secondary input shaft. A control circuit is employed to command the operation of the clutch, the secondary motor, the primary brake, and the secondary brake in response to operator commands.

21 Claims, 11 Drawing Sheets

INFINITELY VARIABLE TRANSMISSION FOR A COMBINE HEADER UNIT

FIELD OF THE INVENTION

The present invention relates to an agricultural combine harvester. In particular, the present invention provides for a transmission for driving a header unit of an agricultural combine at infinitely variable speeds.

BACKGROUND OF THE INVENTION

A combine is a machine that is used in grain farming to harvest a variety of crops from a field. Combines are typically propelled and powered by an on-board engine, but some are also towed and powered by tractors. As a combine moves through a field during a harvesting operation, ripened crop is cut from the field by a header at the front of the combine. The crop is then transferred into threshing and separating assemblies within the combine, where grain is removed from the crop material. The resulting clean grain is stored in a grain tank located on the combine. The clean grain can then be transported from the grain tank to a truck, grain cart or other receiving bin by an unloading auger.

Header units may be configured in a variety of arrangements for harvesting different types of crops. Examples include those configured for harvesting corn (corn head) and those for harvesting cereal grains (grain head). Ordinarily, most of the functions of the header unit are driven mechanically, receiving power directly from the engine via a transmission. The transmission typically comprises: a fixed-speed or variable-speed belt-drive in combination with a further gear reduction, such as a planetary gear-train. In addition, hydrostatic motors may be employed to drive additional header functions, such as a gathering reel on the grain head.

Under normal harvesting conditions, the engine is preferably set at a fixed operating speed by the operator, with the mechanically driven functions of the header unit also operating at a constant fixed speed relative to engine speed. Conversely, the ground speed of the combine may be varied with operator control of the variable-speed hydrostatic transmission, irregardless of engine speed. Any hydrostatically driven functions of the header unit may also be varied independently by operator control, but are often configured to operate at variable speeds relative to ground speed, or at speeds proportional to the operation speed of mechanically-driven header functions.

With a constant-speed belt-drive in heavy harvesting condition, the increased load on the header unit causes the power output of the engine to increase in order to maintain a constant operating speed. If the load on the header becomes excessive and the power capacity of the engine at the fixed operating speed is exceeded, the engine will slow down and potentially stall unless the operator of the combine reduces the ground speed. To address this problem, a variable-speed belt drive may be employed in combination with load sensors that trigger the belt-drive ratio to be varied under heavy harvesting conditions, causing the header unit to slow down rather than draw excessive power from the engine. However, the reduced header speed will still prompt the operator of the combine to reduce ground speed, resulting in diminished harvesting productivity.

SUMMARY OF THE INVENTION

The present invention is an infinitely variable transmission (IVT) for a combine, adapted for transferring power from the engine to a header unit of the combine. The IVT comprises a secondary motor coupled to a secondary output shaft, a primary input shaft that is coupled to an electric clutch via a fixed speed belt-drive, and a header output shaft that is coupled to the header unit. A planetary gear-train couples the primary input, secondary input, and header output shafts. The planetary gear-train comprises a sun gear coupled to the primary input shaft, and a ring gear coupled to the secondary input shaft. The planetary gear-train further comprises a planet gear assembly that meshes with both the sun gear and ring, and is coupled to the header output shaft. Additionally, the IVT includes a normally-disengaged brake coupled to the primary input shaft, and a normally-engaged brake coupled to the secondary input shaft. The function of the IVT is controlled by a control circuit that is adapted to receive commands from the operator corresponding to desired modes of header operation.

In operation with the IVT, the operator may command the operating speed of the header to be increased or reduced as desired. Additionally, the operator may command increased header speed as heavy conditions are encountered in order to maintain the fixed operating speed of the engine. Alternatively, speed sensors or load sensors could be utilized to trigger increased header speed as heavy conditions are encountered in order to maintain the fixed operating speed of the engine. Other functions with the IVT include the capability for rapid shutdown of the header unit, as well as low-speed forward and reverse operation of the header unit.

DETAILED DESCRIPTION

Figure 1:
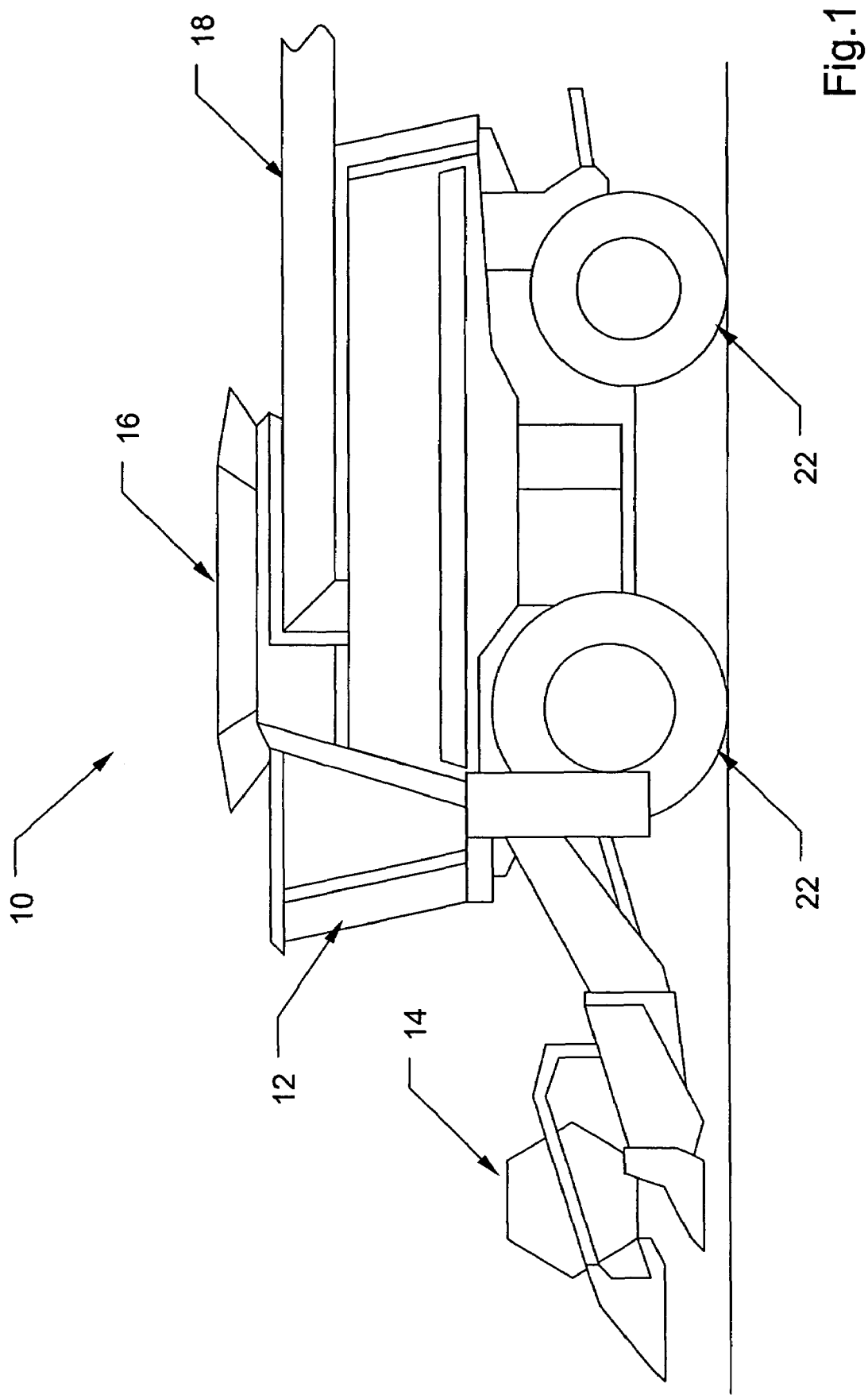
FIG. 1 is a side view of an agricultural combine with a corn head unit.

FIG. 1 illustrates a self-propelled combine 10 commonly used in grain farming to harvest a variety of crops from a field. An operator controls the functions of the combine 10 from an operator's station 12. As the combine 10 moves through a field during a harvesting operation, ripened crop is cut from the field by a header unit 14 at the front of the combine 10. The crop is then transferred into threshing and separating assemblies within the combine 10, where grain is removed from the crop material. The resulting clean grain is stored in a grain tank 16 located on the combine 10. The clean grain can then be transported from the grain tank 16 to a truck, grain cart or other receiving bin by an unloading auger 18. The combine 10 is typically powered by an engine 20, but may also draw power from other sources such as batteries or fuel cells in combination with electric motors. A variable speed hydrostatic transmission is typically used to drive ground engaging wheels 22 that support and propel the combine 10. An electric clutch 24 is normally used to couple a primary output shaft 26 from the engine 20 to a transmission that transfers power to the header unit 14.

Figure 2:
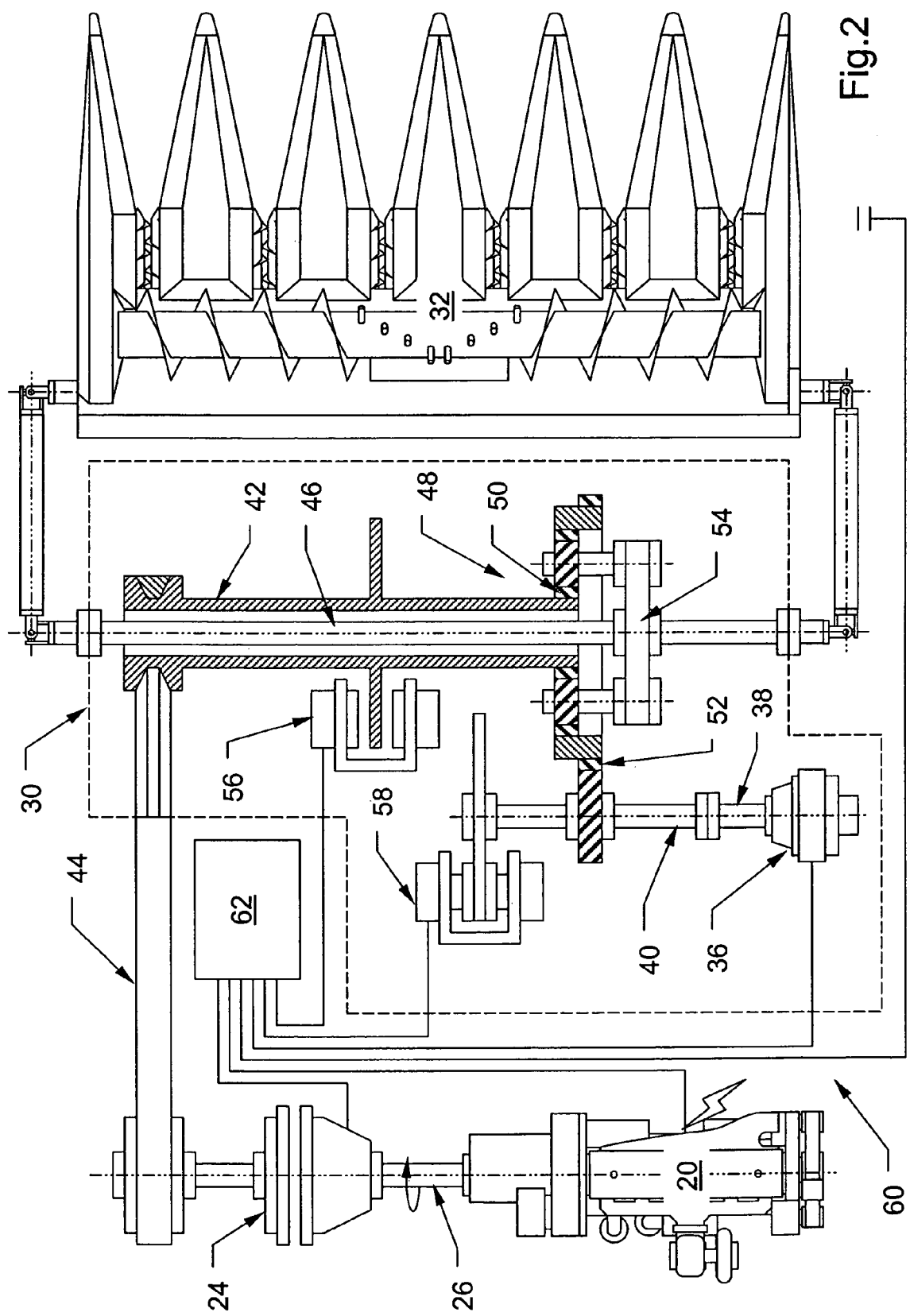
FIG. 2 is a schematic view of the infinitely variable transmission driving a corn head unit, shown disengaged.
Figure 7:
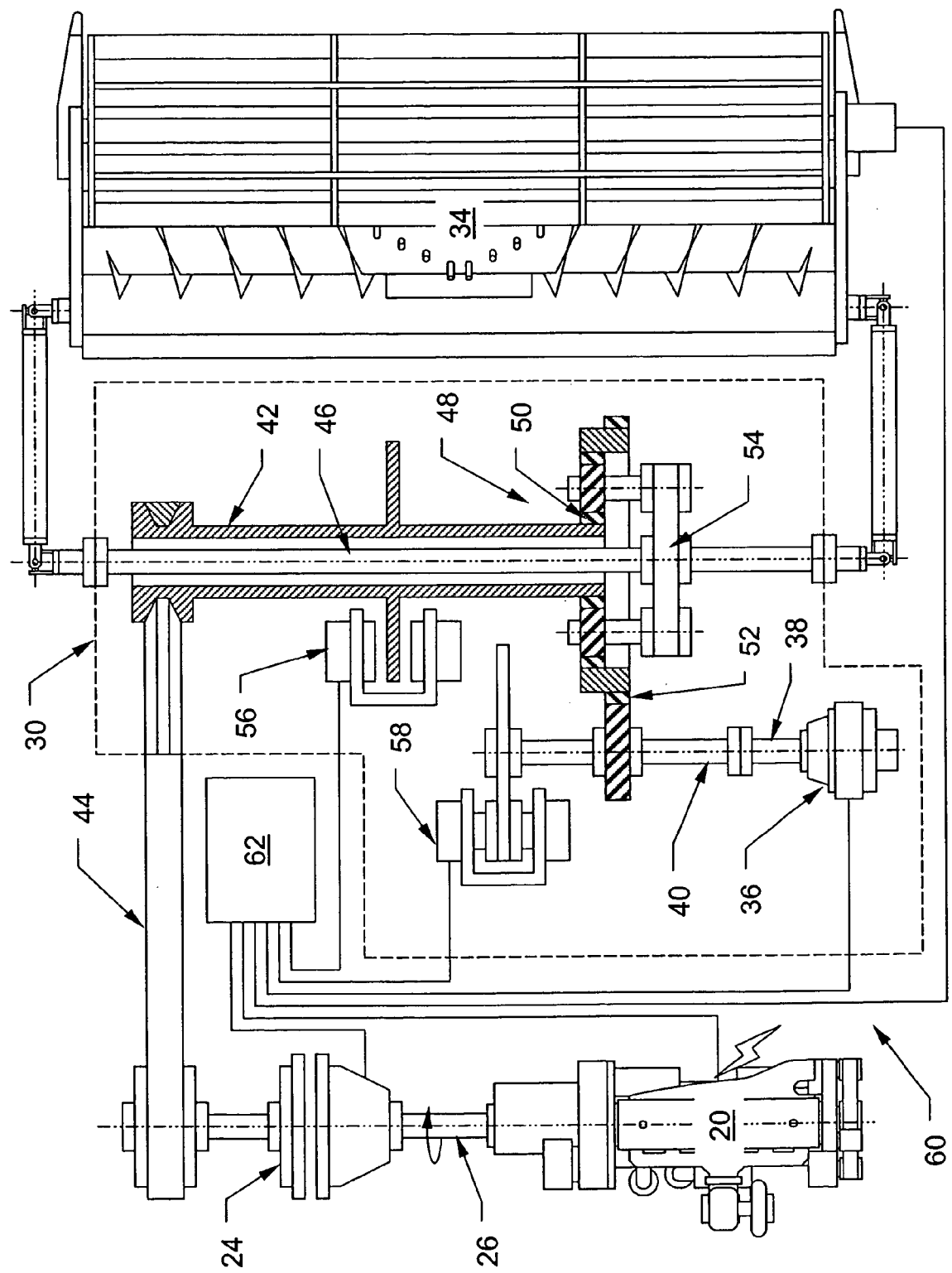
FIG. 7 is a schematic view of the infinitely variable transmission driving a grain platform unit, shown disengaged.

FIGS. 2 and 7 illustrate an infinitely variable speed transmission (IVT) 30 that extends between the engine 20 and the header unit 14. FIG. 2 illustrates the IVT 30 with a corn head 32, and FIG. 7 shows the same transmission with a grain head 34. The IVT 30 comprises a secondary motor 36 having a secondary output shaft 38, a secondary input shaft 40 that is coupled to the secondary output shaft 38, a primary input shaft 42 that is coupled to the electric clutch 24 via a fixed-speed belt-drive 44, and a header output shaft 46 that is coupled to the header unit 14. A planetary gear-train 48 couples the primary input shaft 42, secondary input shaft 40, and header output shaft 46 to one another. The planetary gear-train 48 comprises a sun gear 50 coupled to the primary input shaft 42, and a ring gear 52 coupled to the secondary input shaft 40. The planetary gear-train 48 further comprises a planet gear assembly 54 that meshes with both the sun gear 50 and ring gear 52, and is coupled to the header output shaft 46. Additionally, the IVT 30 further comprises a normally-disengaged primary brake 56 coupled to the primary input shaft 42, and a normally-engaged secondary brake 58 coupled to the secondary input shaft 40. The secondary motor 36 in the illustrated embodiment is a hydrostatic motor, but other motor types, such as variable-speed electric motors, could also be used.

The function of the IVT 30 is controlled by a control circuit 60 that is adapted to receive commands from the operator corresponding to desired modes of header unit 14 operation. The control circuit 60 is configured to communicate with the clutch 24, the secondary motor 36, the primary brake 56, and the secondary brake 58. The control circuit 60 is adapted to command the clutch 24 to couple the primary output shaft 26 to the primary input shaft 42, and to command the secondary motor 36 to maintain variable forward and reverse rotational speeds of the secondary output shaft 38. The control circuit 60 is further adapted to command the primary brake 56 to halt rotation of the primary input shaft 42, and to command the secondary brake 58 to release the secondary input shaft 40 for rotation. The control circuit 60 may be arranged in a number of configurations typical for powered machinery, but is illustrated here as comprising an electronic controller 62.

Figure 3:
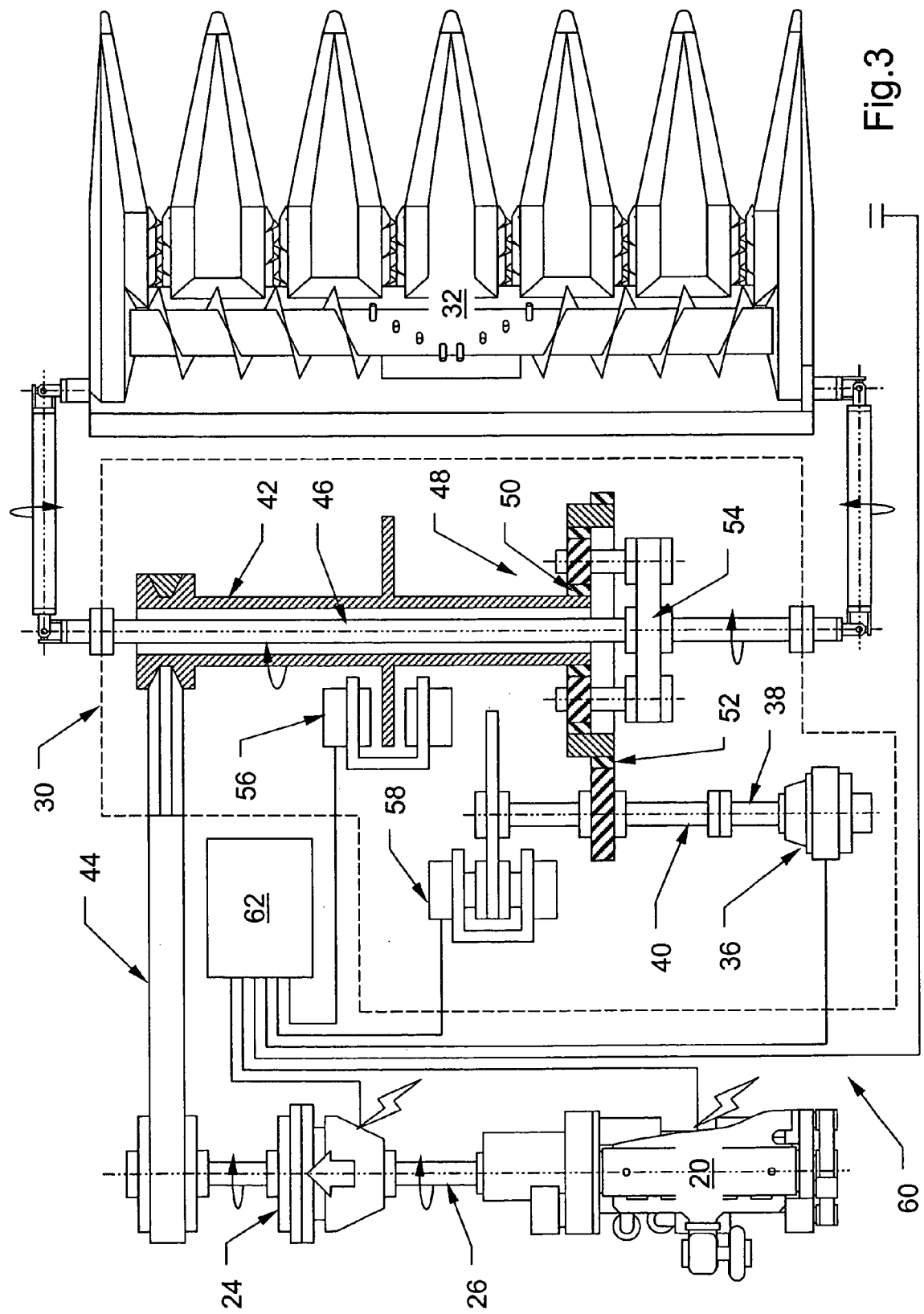
FIG. 3 is a schematic view of the infinitely variable transmission driving a corn head unit, shown in normal fixed-speed operation.
Figure 8:
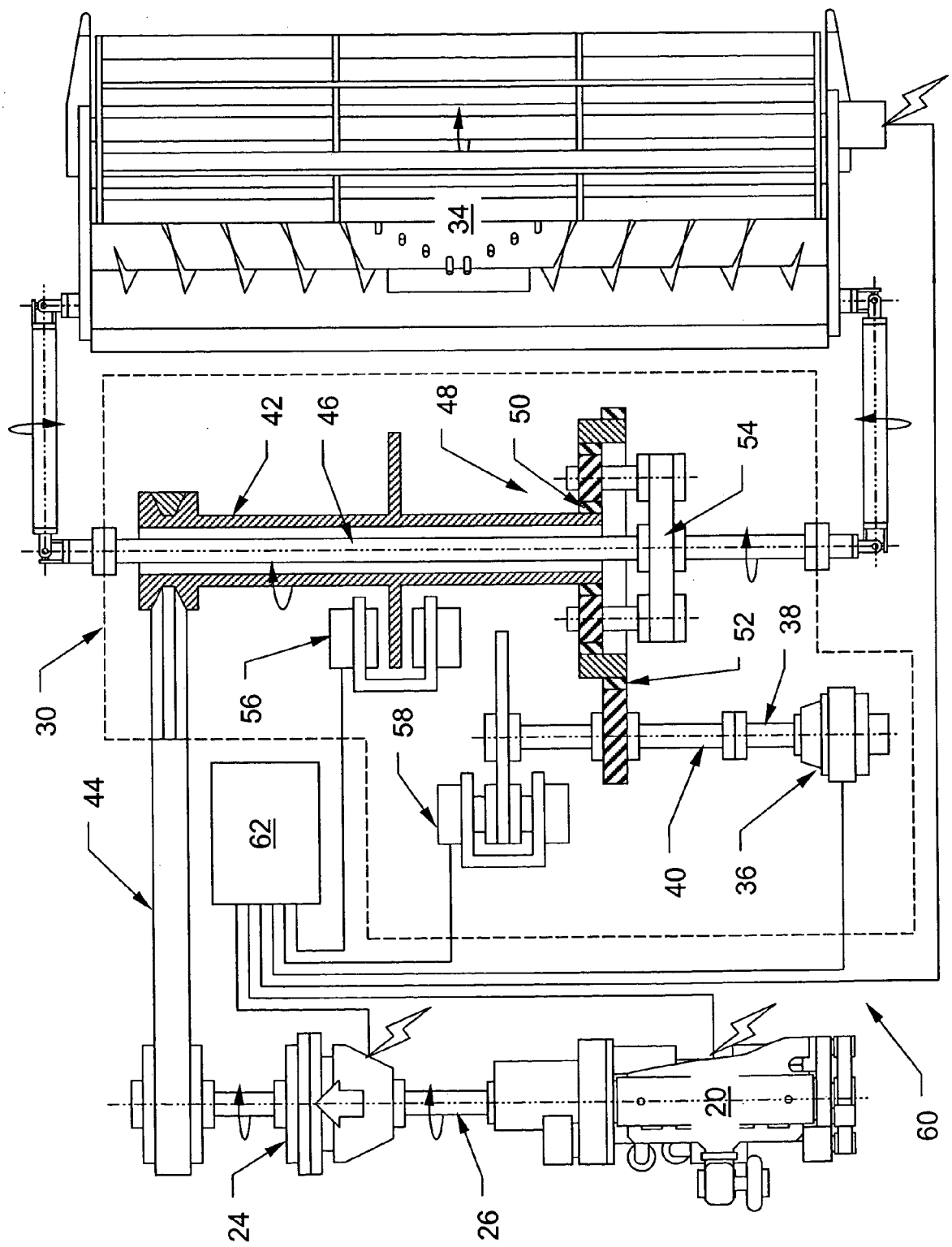
FIG. 8 is a schematic view of the infinitely variable transmission driving a grain platform unit, shown in normal fixed-speed operation.

FIGS. 3 and 8 illustrate the IVT 30 during normal fixed-speed operation of the header unit 14. FIG. 3 illustrates the IVT 30 with a corn head 32, and FIG. 8 illustrates the IVT 30 with a grain head 34. In response to an operator command for this mode, the controller 62 commands the clutch 24 to engage, coupling the primary output shaft 26 to the primary input shaft 42 via the belt drive 44. The primary brake 56 remains normally-disengaged, allowing the primary input shaft 42 to rotate. The secondary brake 58 remains normally-engaged, preventing the secondary input shaft 40 and the ring gear 52 of the planetary gear-train 48 from rotating. With the ring gear 52 held stationary, the primary input shaft 42 and sun gear 50 rotation is thus proportionally translated to the planet gear assembly 54 and the header output shaft 46. The resulting header output shaft 46 rotation corresponds to the normal fixed-speed operation of the header unit 14.

Figure 4:
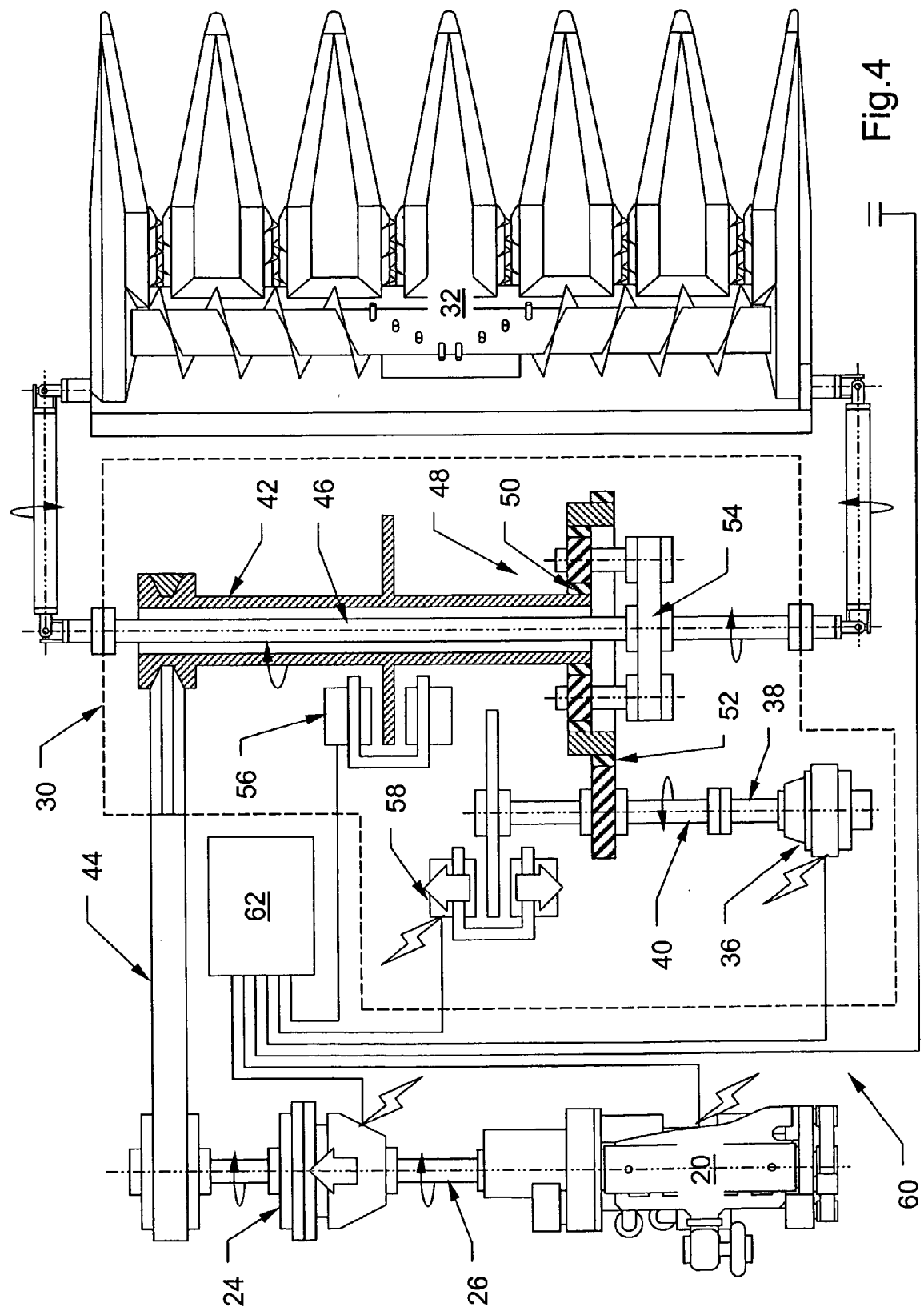
FIG. 4 is a schematic view of the infinitely variable transmission driving a corn head unit, shown in variable high-speed operation.
Figure 9:
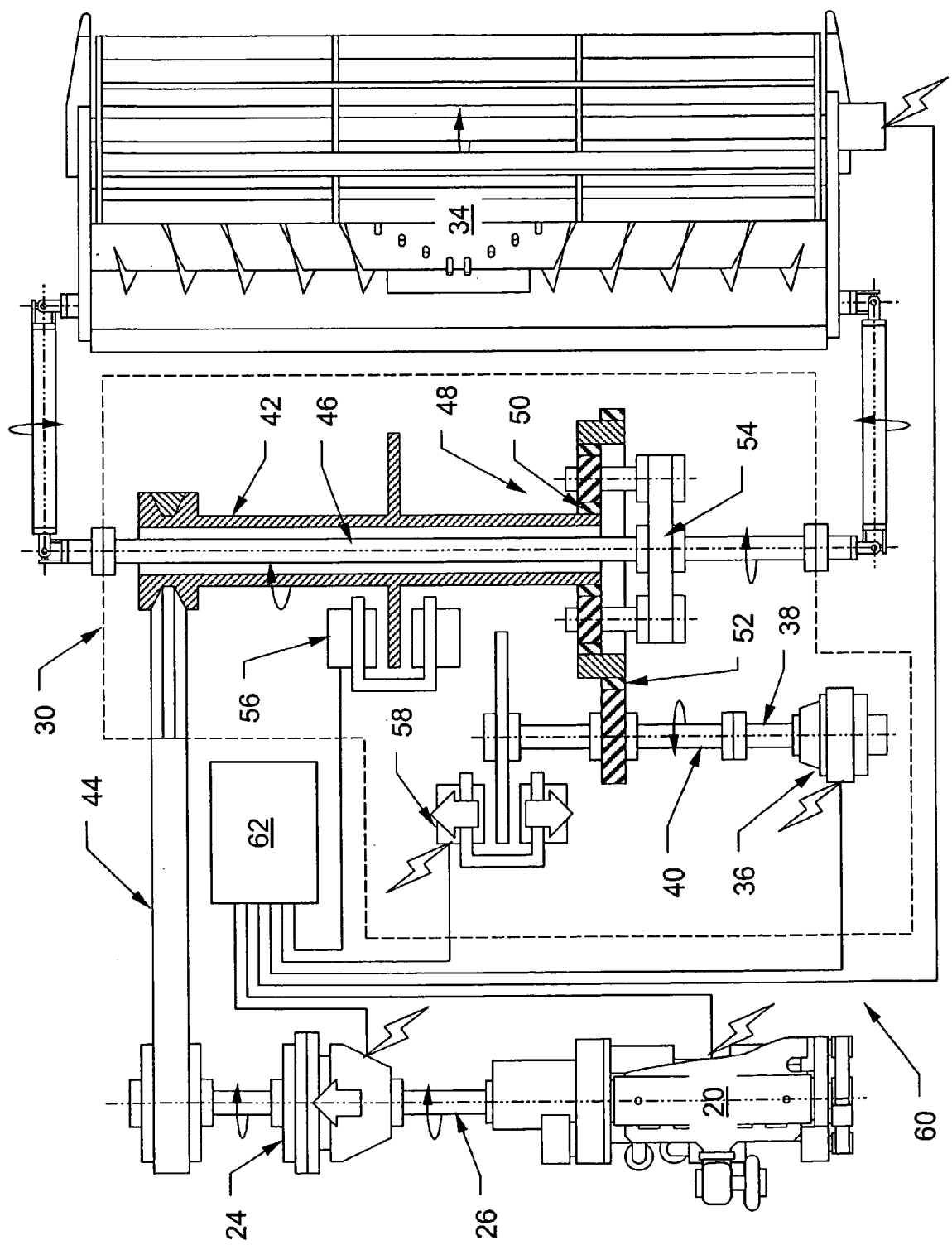
FIG. 9 is a schematic view of the infinitely variable transmission driving a grain platform unit, shown in variable high-speed operation.

FIGS. 4 and 9 illustrate the IVT 30 during variable high-speed operation of the header unit 14. FIG. 4 illustrates the IVT 30 with a corn head 32, and FIG. 9 illustrates the IVT 30 with a grain head 34. In response to an operator command for this mode, the controller 62 commands, or continues to command, the clutch 24 to engage, coupling the primary output shaft 26 to the primary input shaft 42 via the belt drive 44. The primary brake 56 remains normally-disengaged, allowing the primary input shaft 42 to rotate. But here, the controller 62 commands the secondary brake 58 to disengage, allowing the secondary input shaft 40 and the ring gear 52 of the planetary gear-train 48 to rotate. Additionally, the controller 62 is adapted to further command the secondary motor 36 to rotate the secondary output shaft 38, either forward or backward, in response to command from the operator for increased or decreased speed of the header unit 14 from that of normal fixed-speed operation. Typically, in the absence of an operator command to the contrary, the controller 62 will command the secondary motor 36 to hold the secondary output shaft 38 stationary while in this mode. With the secondary input shaft 40 and ring gear 52 of the planetary gear-train 48 held stationary, the primary input shaft 42 rotation is proportionally translated to the planet gear assembly 54 and the header output shaft 46. The resulting header output shaft 46 rotation is thus the same as that of normal fixed-speed operation of the header unit 14.

When the operator further commands the operating speed of the header unit 14 to be increased above that of normal fixed-speed operation by a desired amount, the controller 62 commands the secondary motor 36 to rotate the secondary output shaft 38 forward at a speed proportional to the operator command. The rotation of the secondary input shaft 40 and the ring gear 52 is thus proportionally added to the planet gear assembly 54 and the header output shaft 46. The resulting header output shaft 46 rotational speed is thus greater than that of normal fixed-speed operation of the header unit 14. Conversely, when the operator further commands the operation speed of the header unit 14 to be decreased below that of normal fixed-speed operation, the controller 62 commands the secondary motor 36 to rotate the secondary output shaft 38 backward at a speed proportional to the operator command. In this case, the rotation of the secondary input shaft 40 and the ring gear 52 is proportionally subtracted from the planet gear assembly 54 and the header output shaft 46, and the resulting header output shaft 46 rotational speed is less than that of normal fixed-speed operation. Although illustrated as being manually controlled by operator command, the operating speed of the header unit 14 driven with the IVT 30 may be automatically controlled, for example, relative to variable ground speed and/or variable crop conditions.

Figure 5:
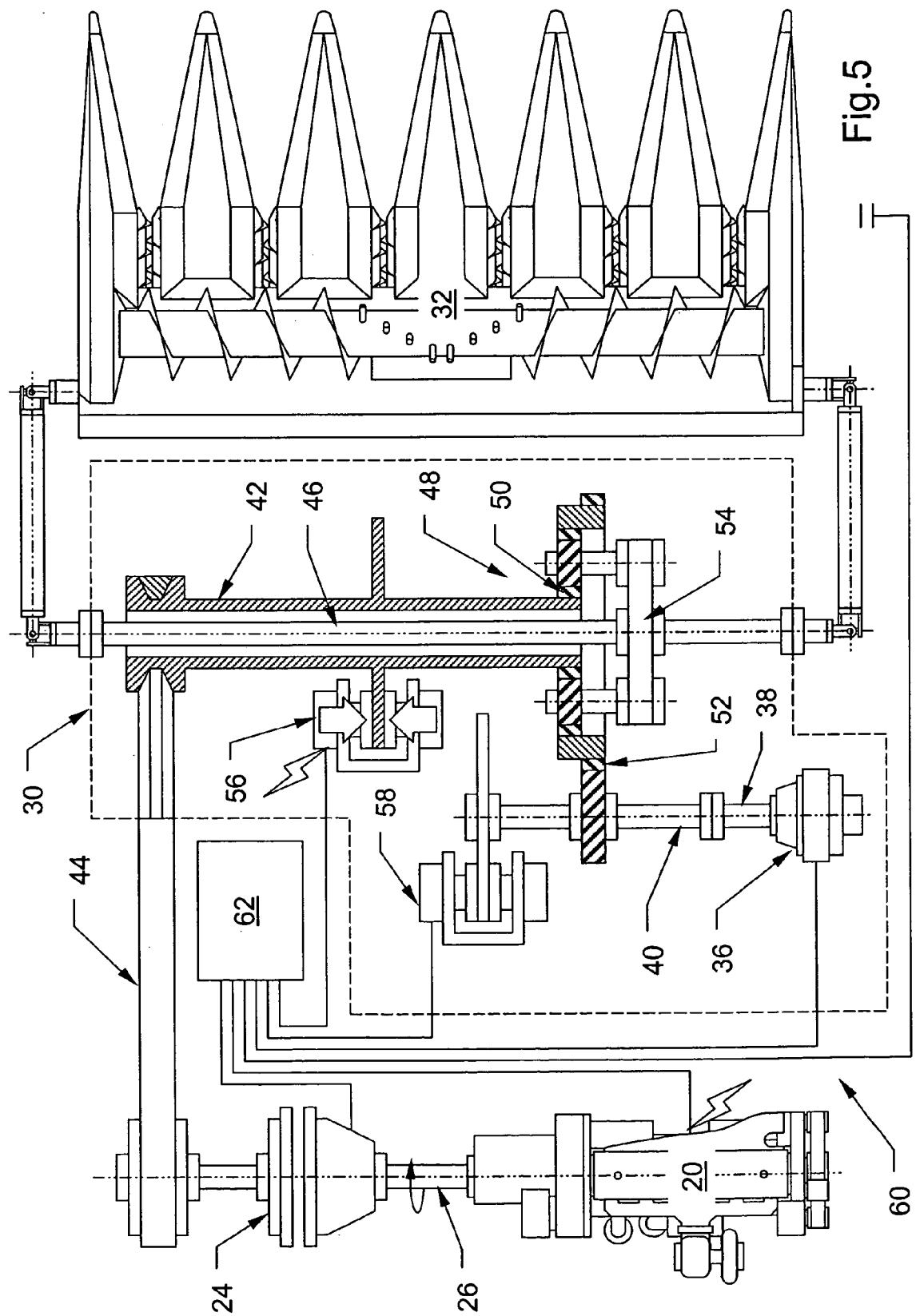
FIG. 5 is a schematic view of the infinitely variable transmission driving a corn head unit, shown for a rapid shut-down of the corn head unit.
Figure 10:
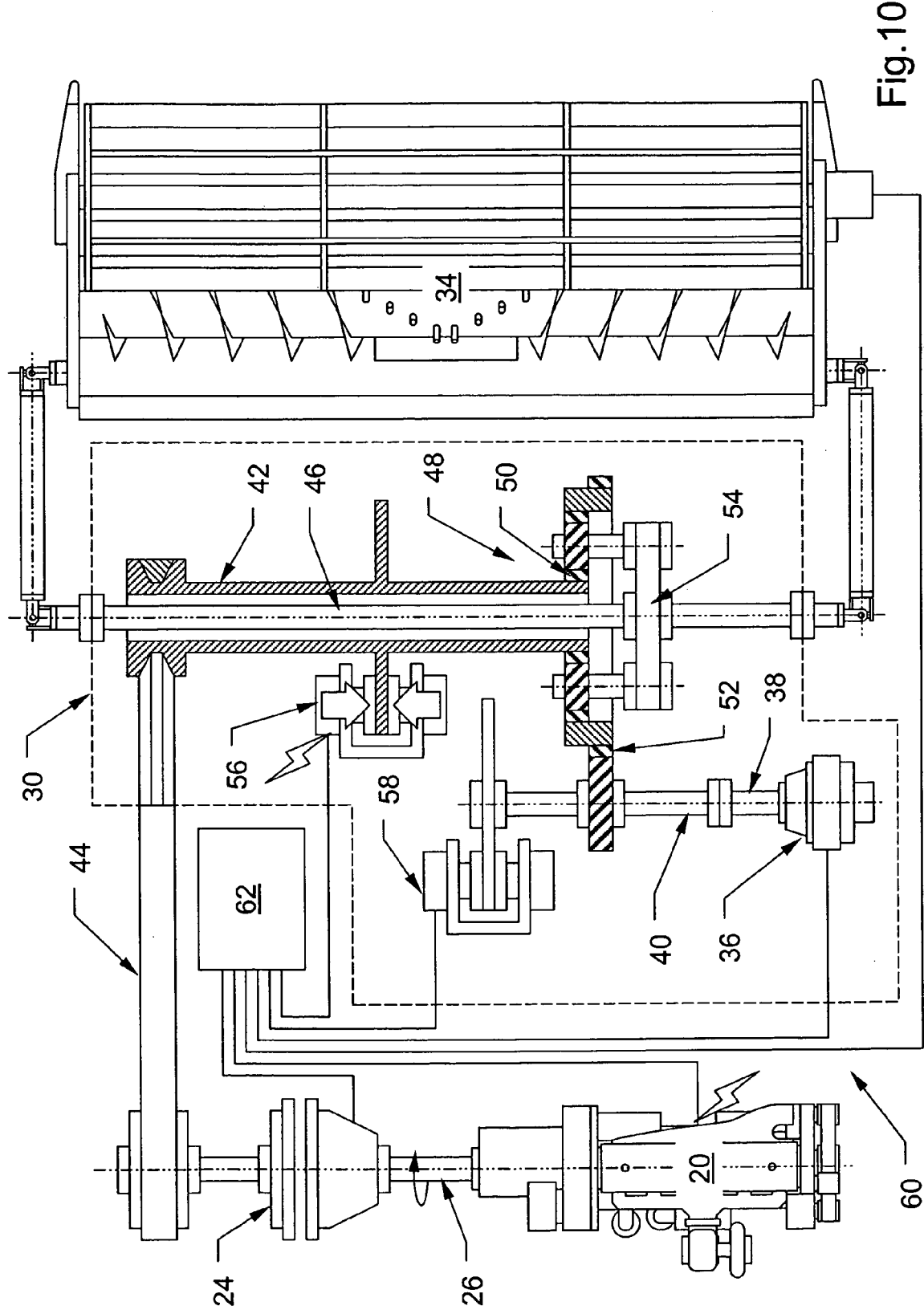
FIG. 10 is a schematic view of the infinitely variable transmission driving a grain platform unit, shown for a rapid shut-down of the grain platform unit.

FIGS. 5 and 10 illustrate the IVT 30 during a rapid shut-down of the header unit 14. FIG. 5 illustrates the IVT 30 with a corn head 32, and FIG. 10 illustrates the IVT 30 with a grain head 34. In response to an operator command for this mode, the controller 62 discontinues commanding clutch 24 engagement, allowing the clutch 24 to return to a normally-disengage position, un-coupling the primary output shaft 26 from the belt-drive 44 and the primary input shaft 42. The secondary brake 58 remains in, or returns to, a normally-engaged position, preventing the secondary input shaft 40 and the ring gear 52 of the planetary gear-train 48 from rotating. But here, the controller 62 commands the primary brake 56 to engage, rapidly halting the rotation of the primary input shaft 42 and the sun gear 50 of the planetary gear-train 48. As the rotation of both the ring gear 52 and the sun gear 50 are brought to a rapid halt, the rotation of the meshing planet gear assembly 54 and the header output shaft 46 is also brought to a halt, resulting in a rapid shut-down of the mechanically driven functions of the header unit 14.

Figure 6:
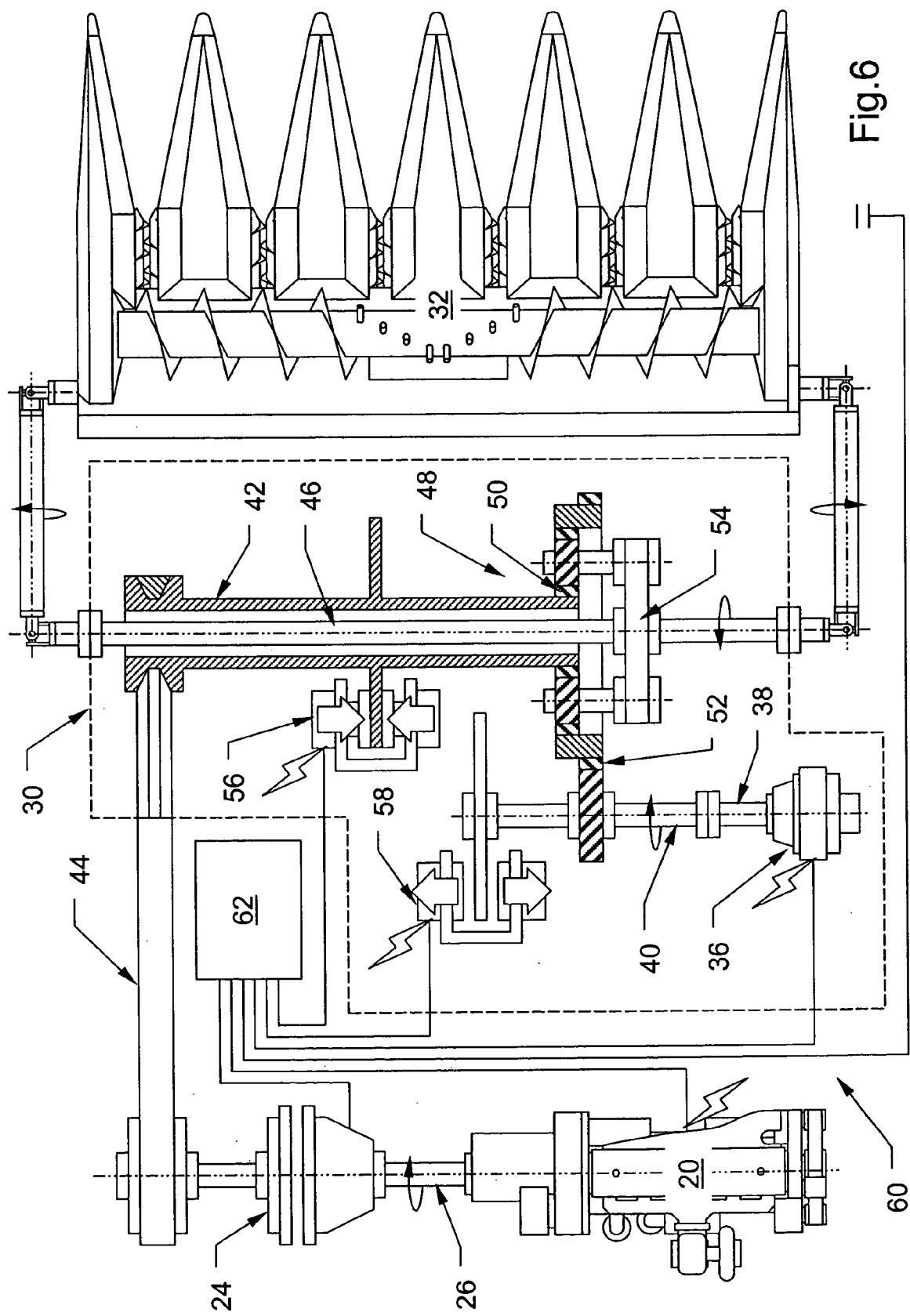
FIG. 6 is a schematic view of the infinitely variable transmission driving a corn head unit, shown in variable low-speed operation.
Figure 11:
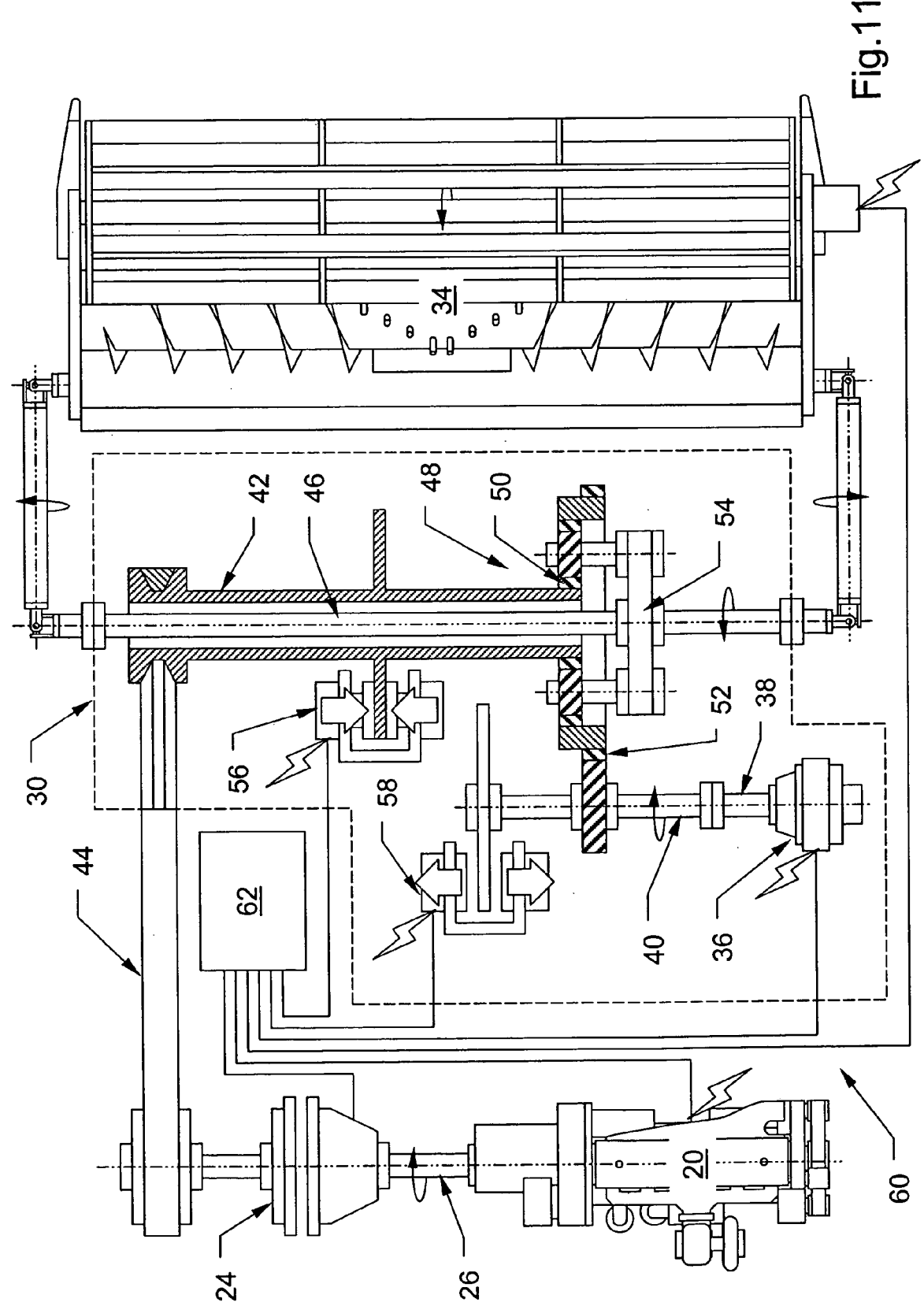
FIG. 11 is a schematic view of the infinitely variable transmission driving a grain platform unit, shown in variable low-speed operation.

FIGS. 6 and 11 illustrate the IVT 30 during variable low-speed operation of the header unit 14. FIG. 6 illustrates the IVT 30 with a corn head 32, and FIG. 11 illustrates the IVT 30 with a grain head 34. In response to an operator command for this mode, the controller 62 discontinues commanding clutch 24 engagement, allowing the clutch 24 to return to, or remain in, a normally-disengage position, uncoupling the primary output shaft 26 from the belt-drive 44 and the primary input shaft 42. The controller 62 commands, or continues to command, the primary brake 56 to engage, preventing the primary input shaft 42 and the sun gear 50 of the planetary gear-train 48 from rotating. The controller 62 commands the secondary brake 58 to disengage, allowing the secondary input shaft 40 and the ring gear 52 of the planetary gear-train 48 to rotate. Additionally, the controller 62 is adapted to further command the secondary motor 36 to rotate the secondary output shaft 38, either forward or backward, in response to command from the operator for a desired low-speed forward or reverse operation of the header unit 14.

When the operator commands forward operation of the header unit 14 at a desired low-speed, the controller 62 commands the secondary motor 36 to rotate the secondary output shaft 38 forward at a speed proportional to the operator command. With the primary input shaft 42 and the sun gear 50 held stationary, the rotation of the secondary input shaft 40 and the ring gear 52 is thus proportionally translated to the planet gear assembly 54 and the header output shaft 46. The resulting header output shaft 46 rotation corresponds to a desired low-speed forward operation of the header unit 14. Conversely, when the operator commands reverse operation of the header unit 14 at a desired low-speed, the controller 62 commands the secondary motor 36 to rotate the secondary output shaft 38 backward at a speed proportional to the operator command. Again, with the primary input shaft 42 and the sun gear 50 held stationary, the rotation of the secondary input shaft 40 and the ring gear 52 is proportionally translated to the planet gear assembly 54 and the header output shaft 46. The resulting header output shaft 46 rotation corresponds to a desired low-speed reverse operation of the header unit 14.

Having described the illustrated embodiment, it will become apparent that various modifications can be made without departing from the scope of the invention as defined in the accompanying claims.

The invention claimed is:

1. A mechanism for powering a combine header comprising:
   a primary motor having a rotatable primary output shaft, the primary motor being adapted to rotate the primary output shaft at forward rotational speeds;
   a rotatable primary input shaft;
   a clutch extending between the primary output shaft and the primary input shaft, the clutch being adapted to controllably couple the primary output shaft to the primary input shaft;
   a variable speed secondary motor having a rotatable secondary output shaft, the secondary motor being adapted to controllably rotate the secondary output shaft at variable forward and reverse rotational speeds;
   a rotatable secondary input shaft coupled to the secondary output shaft;
   a rotatable header output shaft adapted to transmit power to the combine header;
   a planetary gear-train comprising a sun gear, a ring gear, and a planet gear assembly, the planet gear assembly having planet gears meshing with the sun gear and with the ring gear, the sun gear being coupled exclusively to one of the primary input shaft, the secondary input shaft, and the header output shaft, the ring gear being coupled exclusively to one of the remaining of the primary input shaft, the secondary input shaft, and the header output shaft, and the planet gear assembly being coupled exclusively to the other of the remaining of the primary input shaft, the secondary input shaft, and the header output shaft;
   a control circuit adapted for receiving command from an operator, the control circuit being in communication with the clutch and the secondary motor, the control circuit being adapted to command the clutch to couple the primary output shaft to the primary input shaft in response to operator command, and to command the secondary motor maintain variable forward and reverse rotational speeds of the secondary output shaft in response to operator commandp; and further comprising a secondary brake coupled to the secondary input shaft, the secondary brake being adapted to fix the secondary input shaft rotation at zero, and to controllably release the secondary input shaft for rotation, the control circuit being in communication with the secondary brake, and being adapted to command the secondary brake to release the secondary input shaft for rotation in response to operator command.

2. The mechanism described in claim 1, wherein the control circuit commands the clutch to couple the primary output shaft to the primary input shaft in response to an operator command for normal fixed-speed operation of the combine header.

3. The mechanism described in claim 2, wherein the control circuit further commands the secondary brake to release the secondary input shaft for rotation, and commands the secondary motor to maintain variable forward and reverse rotational speeds of the secondary output shaft, in response to operator command for variable high-speed operation of the combine header.

4. A mechanism for powering a combine header comprising:
   a primary motor having a rotatable primary output shaft, the primary motor being adapted to rotate the primary output shaft at forward rotational speeds;

a rotatable primary input shaft;

a clutch extending between the primary output shaft and the primary input shaft, the clutch being adapted to controllably couple the primary output shaft to the primary input shaft;

a variable speed secondary motor having a rotatable secondary output shaft, the secondary motor being adapted to controllably rotate the secondary output shaft at variable forward and reverse rotational speeds;

a rotatable secondary input shaft coupled to the secondary output shaft;

a rotatable header output shaft adapted to transmit power to the combine header;

a planetary gear-train comprising a sun gear, a ring gear, and a planet gear assembly, the planet gear assembly having planet gears meshing with the sun gear and with the ring gear, the sun gear being coupled exclusively to one of the primary input shaft, the secondary input shaft, and the header output shaft, the ring gear being coupled exclusively to one of the remaining of the primary input shaft, the secondary input shaft, and the header output shaft, and the planet gear assembly being coupled exclusively to the other of the remaining of the primary input shaft, the secondary input shaft, and the header output shaft;

a control circuit adapted for receiving command from an operator, the control circuit being in communication with the clutch and the secondary motor, the control circuit being adapted to command the clutch to couple the primary output shaft to the primary input shaft in response to operator command, and to command the secondary motor maintain variable forward and reverse rotational speeds of the secondary output shaft in response to operator commandp; and further comprising a primary brake coupled to the primary input shaft, the primary brake being adapted to controllably halt rotation of the primary input shaft, and to fix the primary input shaft rotation at zero, the control circuit being in communication with the primary brake, and being adapted to command the primary brake to halt rotation of the primary input shaft, and to fix the primary input shaft rotation at zero, in response to operator command.

5. The mechanism described in claim 4, wherein the control circuit commands the clutch to couple the primary output shaft to the primary input shaft, and commands the secondary motor to maintain a fixed rotational speed of the secondary output shaft at zero, in response to an operator command for normal fixed-speed operation of the combine header.

6. The mechanism described in claim 5, wherein the control circuit further commands the secondary motor to maintain variable forward and reverse rotational speeds of the secondary output shaft, in response to operator command for variable high-speed operation of the combine header.

7. The mechanism described in claim 4, wherein the control circuit commands the primary brake to halt rotation of the primary input shaft, and to fix the primary input shaft rotation at zero, and commands the secondary motor to maintain variable forward and reverse rotational speeds of the secondary output shaft, in response to operator command for variable low-speed operation of the combine header.

8. The mechanism described in claim 4 further comprising a secondary brake coupled to the secondary input shaft, the secondary brake being adapted to fix the secondary input shaft rotation at zero, and to controllably release the secondary input shaft for rotation, the control circuit being in communication with the secondary brake, and being adapted to command the secondary brake to release the secondary input shaft for rotation in response to operator command.

9. The mechanism described in claim 8, wherein the control circuit commands the clutch to couple the primary output shaft to the primary input shaft in response to an operator command for normal fixed-speed operation of the combine header.

10. The mechanism described in claim 9, wherein the control circuit further commands the secondary brake to release the secondary input shaft for rotation, and commands the secondary motor to maintain variable forward and reverse rotational speeds of the secondary output shaft, in response to operator command for variable high-speed operation of the combine header.

11. The mechanism described in claim 8, wherein the control circuit commands the primary brake to halt rotation of the primary input shaft, and to fix the primary input shaft rotation at zero, commands the secondary brake to release the secondary input shaft for rotation, and commands the secondary motor to maintain variable forward and reverse rotational speeds of the secondary output shaft, in response to operator command for variable low-speed operation of the combine header.

12. The mechanism described in claim 8, wherein the control circuit commands the primary brake to halt rotation of the primary input shaft, and to fix the primary input shaft rotation at zero, in response to an operator command for a rapid shut-down of the combine header.

13. A mechanism for powering a combine header comprising:

a primary motor having a rotatable primary output shaft, the primary motor being adapted to rotate the primary output shaft at forward rotational speeds;

a rotatable primary input shaft;

a clutch extending between the primary output shaft and the primary input shaft, the clutch being adapted to controllably couple the primary output shaft to the primary input shaft;

a variable speed secondary motor having a rotatable secondary output shaft, the secondary motor being adapted to controllably rotate the secondary output shaft at variable forward and reverse rotational speeds;

a rotatable secondary input shaft coupled to the secondary output shaft;

a rotatable header output shaft adapted to transmit power to the combine header;

a planetary gear-train comprising a sun gear, a ring gear, and a planet gear assembly, the planet gear assembly having planet gears meshing with the sun gear and with the ring gear, the sun gear being coupled exclusively to one of the primary input shaft, the secondary input shaft, and the header output shaft, the ring gear being coupled exclusively to one of the remaining of the primary input shaft, the secondary input shaft, and the header output shaft, and the planet gear assembly being coupled exclusively to the other of the remaining of the primary input shaft, the secondary input shaft, and the header output shaft;

a primary brake coupled to the primary input shaft;

a secondary brake coupled to the secondary input shaft; and a control circuit adapted for receiving command from an operator, the control circuit being in communication with the clutch, the secondary motor, the primary brake, and the secondary brake, the control circuit being adapted to command the clutch to couple the primary output shaft to the primary input shaft in response to operator command, to command the secondary motor to maintain variable forward and reverse rotational speeds of the secondary output shaft in response to operator command, to command the primary brake to halt rotation of the primary input shaft, and to fix the primary input shaft rotation at zero, in response to operator command, and to command the secondary brake to release the secondary input shaft for rotation in response to operator command.

14. The mechanism described in claim 13, wherein the control circuit commands the clutch to couple the primary output shaft to the primary input shaft in response to an operator command for normal fixed-speed operation of the combine header.

15. The mechanism described in claim 14, wherein the control circuit further commands the secondary brake to release the secondary input shaft for rotation, and commands the secondary motor to maintain variable forward and reverse rotational speeds of the secondary output shaft, in response to operator command for variable high-speed operation of the combine header.

16. The mechanism described in claim 13, wherein the control circuit commands the primary brake to halt rotation of the primary input shaft, and to fix the primary input shaft rotation at zero, commands the secondary brake to release the secondary input shaft for rotation, and commands the secondary motor to maintain variable forward and reverse rotational speeds of the secondary output shaft, in response to operator command for variable low-speed operation of the combine header.

17. The mechanism described in claim 13, wherein the control circuit commands the primary brake to halt rotation of the primary input shaft, and to fix the primary input shaft rotation at zero, in response to an operator command for a rapid shut-down of the combine header.

18. The mechanism described in claim 13, wherein the primary motor comprises an engine and a transmission.

19. The mechanism described in claim 13, wherein the secondary motor comprises a variable speed hydrostatic motor.

20. The mechanism described in claim 13, wherein the control circuit comprises an electronic controller.

21. The mechanism described in claim 13, further comprising a continuous belt being adapted to couple the clutch to the primary input shaft.

\* \* \* \* \*